US010465076B2

(12) United States Patent
Gantillon et al.

(10) Patent No.: US 10,465,076 B2
(45) Date of Patent: Nov. 5, 2019

(54) AQUEOUS SEMI-FINISHED AND PRIMARY NON-STICK COATING COMPOSITIONS COMPRISING HETEROCYCLIC POLYMERS

(71) Applicant: SEB S.A., Ecully (FR)

(72) Inventors: Barbara Gantillon, Leschaux (FR); Laurent Voisin, Sales (FR); Isabelle Joutang, La Motte Servolex (FR); Jean-Luc Perillon, Saint Paul Trois Chateaux (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 15/320,523

(22) PCT Filed: Jun. 12, 2015

(86) PCT No.: PCT/FR2015/051570
§ 371 (c)(1),
(2) Date: Dec. 20, 2016

(87) PCT Pub. No.: WO2015/193593
PCT Pub. Date: Dec. 23, 2015

(65) Prior Publication Data
US 2017/0152400 A1    Jun. 1, 2017

(30) Foreign Application Priority Data

Jun. 20, 2014 (FR) ..................... 14 55723
Dec. 30, 2014 (FR) ..................... 14 63460

(51) Int. Cl.
C09D 179/08 (2006.01)
A47J 36/02 (2006.01)
C09D 127/18 (2006.01)
C23C 26/00 (2006.01)
C09D 5/08 (2006.01)
C09D 181/06 (2006.01)
C09D 5/03 (2006.01)
C09D 7/40 (2018.01)
B05D 5/08 (2006.01)
C09D 5/02 (2006.01)
C09D 171/00 (2006.01)
C09D 181/04 (2006.01)
B05D 7/00 (2006.01)
C09D 127/12 (2006.01)
C09D 7/20 (2018.01)
C09D 7/65 (2018.01)
B05D 7/14 (2006.01)

(52) U.S. Cl.
CPC .............. C09D 5/031 (2013.01); A47J 36/02 (2013.01); A47J 36/025 (2013.01); B05D 5/08 (2013.01); B05D 5/083 (2013.01); B05D 7/542 (2013.01); C09D 5/024 (2013.01); C09D 5/033 (2013.01); C09D 5/08 (2013.01); C09D 7/20 (2018.01); C09D 7/65 (2018.01); C09D 7/69 (2018.01); C09D 127/12 (2013.01); C09D 127/18 (2013.01); C09D 171/00 (2013.01); C09D 179/08 (2013.01); C09D 179/085 (2013.01); C09D 181/04 (2013.01); C09D 181/06 (2013.01); C23C 26/00 (2013.01); B05D 7/14 (2013.01); B05D 2202/25 (2013.01); C08G 2650/40 (2013.01)

(58) Field of Classification Search
None
See application file for complete search history.

(56) References Cited

U.S. PATENT DOCUMENTS

| 6,333,372 B1* | 12/2001 | Tomihashi | C09D 5/002 524/104 |
|---|---|---|---|
| 2007/0036900 A1* | 2/2007 | Liu | B05D 5/08 427/372.2 |
| 2008/0131703 A1* | 6/2008 | Buffard | A47J 36/02 428/421 |
| 2012/0034448 A1* | 2/2012 | Liu | B05D 5/083 428/325 |
| 2014/0127486 A1* | 5/2014 | Santos | C09D 127/18 428/213 |
| 2017/0158868 A1* | 6/2017 | Gantillon | C09D 5/031 |

FOREIGN PATENT DOCUMENTS

| CN | 101665646 A | 3/2010 |
| EP | 1103582 A1 | 6/1999 |
| GB | 1592886 | 7/1981 |
| JP | 2009242711 A | 10/2009 |

* cited by examiner

Primary Examiner — Joseph D Anthony
(74) Attorney, Agent, or Firm — The Webb Law Firm

(57) ABSTRACT

Provided is an aqueous amine-free coating composition including at least one heterocyclic polymer, wherein the heterocyclic polymer is in the form of powder having a $d_{90}$ less than or equal to 20 μm. Also provided is an aqueous amine-free non-stick coating composition including such an aqueous composition for a coating, and the respective methods for producing same. Further provided is a method for producing an item on one of the faces of a metal substrate, from at least one layer of coating composition or one layer of non-stick coating composition according to the invention.

9 Claims, No Drawings

# AQUEOUS SEMI-FINISHED AND PRIMARY NON-STICK COATING COMPOSITIONS COMPRISING HETEROCYCLIC POLYMERS

CROSS-REFERENCE TO RELATED APPLICATIONS

This application is the United States national phase of International Application No. PCT/FR2015/051570 filed Jun. 12, 2015, and claims priority to French Patent Application Nos. 1455723 and 1463460 filed Jun. 20, 2014, and Dec. 30, 2014, respectively, the disclosures of which are hereby incorporated in their entirety by reference.

FIELD OF THE INVENTION

This invention pertains generally to aqueous coating compositions (or semi-finished compositions), as well as aqueous non-stick coating compositions (or primary compositions) comprising such coating compositions. The non-stick coatings obtained based on the coating compositions and non-stick coating compositions described in this invention offer improved resistance to corrosion and abrasion, as well as reduced yellowing.

For the purposes of this invention, the term "aqueous composition" refers to any composition comprising mostly water, or in other words, at least 50% water by weight with respect to the total weight of said composition.

The invention pertains to the field of formulating semi-finished and primary non-stick coating compositions designed to be applied to heating items, and more specifically, cooking tools or household appliances, as well as to the field of such non-stick coatings.

Examples of cooking tools that can be used within the scope of this invention include frying pans, sauté pans, saucepans, woks, crepe pans, stockpots, crockpots, pressure cookers, egg cookers and grill pans.

Examples of household appliances that can be used within the scope of this invention include fryer vats, melting pots or heavy saucepans for fondue or raclette, and iron soleplates.

DESCRIPTION OF RELATED ART

Experts in the field know that cooking tools must meet certain performance criteria with regard to their non-stick and scratch-resistant properties, and more generally, their resistance to the many stresses to which they are subjected during use.

Fluorinated polymer-based coatings are the ones that offer the best compromise for all of these properties. Nevertheless, one difficulty remains regarding the adhesion of these coatings to the medium of the tool, and a great many solutions have been proposed.

A significant component of the formulations designed to improve the adhesion of polytetrafluoroethylene (PTFE) is made using an adhesive co-resin. Among the most commonly used resins, we find heterocyclic polymers, such as polyamide-imides (PAI) and polyimides (PI). For use in combination with PTFE colloidal dispersions, these adhesive co-resins must necessarily first be put into an aqueous phase, generally according to two methods.

For the purposes of this invention, the term "heterocyclic polymer" refers to any polymer with at least one monomer pattern comprising at least one heterocycle. For the purposes of this invention, the term "heterocycle" refers to any cycle that has at least two different elements as atoms in the cycle.

For the first method, the initial product is a heterocyclic polymer resin in solution in a polar aprotic solvent, such as N-ethylpyrrolidone (NEP) or N-methylpyrrolidone (NMP). Then, a salt is formed from the acid groups by adding very basic primary or secondary amines, and then water is added to the mixture in order to invert the phase of the mixture.

It should be noted that most polar aprotic solvents are subject to labeling as a harmful or even toxic product, according to the REACH regulation (European Parliament and Council Regulation on the Registration, Evaluation, Authorization and Restriction of Chemicals). As a result, the environmental and health-related impact caused by the use of such solvents is non-negligible.

For the purposes of this invention, the term "toxic or harmful solvent" refers to a solvent containing category 1A or 1B chemicals considered to be carcinogens, mutagens or reproductive toxicants, and on which hazard pictograms must be displayed to inform users of the risks and dangers associated with this type of product (as defined in EC Regulation 1272/2008 of the European Parliament and Council of Sep. 16, 2008 and its adjustments with scientific and technical progress).

For the second method, the initial product is a heterocyclic polymer resin in water-emulsifiable powder, to which one or more amines are added to form a salt from the acid groups of the heterocyclic polymer and create an emulsion in hot water.

From a functional standpoint, the first method using heterocyclic polymer resins in solution in a polar aprotic solvent is easier to implement.

However, the use of salt-forming amines opens the imide cycles of the heterocyclic polymer and, as a result, film formation is often not as good as hoped, and the adhesion and/or corrosion-resistance of the coating obtained are consequently weakened. Finally, the use of salt-forming amines, no matter what kind, increases yellowing while the coating is being produced.

SUMMARY OF THE INVENTION

To remedy the disadvantages of the prior art, the applicant has developed aqueous semi-finished and primary compositions that make it possible to obtain coatings that are resistant to high temperatures and abrasion, with reduced—even non-existent—surface yellowing.

More specifically, the objective of this invention is an aqueous, amine-free coating composition (or semi-finished composition) that comprises at least one heterocyclic polymer, said one or more heterocyclic polymers being in the form of a powder with a $d_{90}$ of less than or equal to 20 μm.

Such particle size makes it possible to obtain thin coatings that are abrasion-resistant. Moreover, this particle size reduces the sedimentation effect in the semi-finished composition.

For the purposes of this invention, the term "$d_{90}$" refers to the size at which 90% by volume of the population consists of particles that are smaller than said size.

Advantageously, the one or more heterocyclic polymers are in the form of a powder also having a $d_{50}$ of less than or equal to 10 μm.

For the purposes of this invention, the term "$d_{50}$" refers to the size at which 50% by volume of the population consists of particles that are smaller than said size (median of the particle distribution).

Advantageously, the one or more heterocyclic polymers are in the form of a powder having a minimum $d_{50}$ on the order of 3 μm and a minimum $d_{90}$ of 10 μm.

In this invention, the semi-finished composition is amine-free.

For the purposes of this invention, the term "amine" refers to any nitrogenous compound that is formally derived from ammonia $NH_3$ by replacing one or more hydrogen atoms with carbon groups, such as primary amines, secondary amines, tertiary amines, heterocyclic amines, aliphatic diamines, aliphatic oligoamines, ether amines, ethanol amines, isopropanol amines and alkyl amino alcohols.

Advantageously, the semi-finished composition according to the invention comprises a maximum of 15% solvent by weight, with respect to the total weight of the semi-finished composition.

Advantageously, the solvent used in the semi-finished composition according to this invention can be polar aprotic. The solvent can preferably comprise at least one of the following: N-formylmorpholine (NFM), dimethyl sulfoxide (DMSO), N-acetylmorpholine (NAM), N-ethylpyrrolidone (NEP) and N-methylpyrrolidone (NMP).

In order to obtain non-labeled (or in other words, non-toxic) primary compositions, it is necessary for the concentration in the toxic ("labeled") polar aprotic solvent to be as low as possible, or even zero. One source of this type of solvent comes from a residual content present in the heterocyclic polymer powder. Moreover, adding only a small quantity of such a solvent to the semi-finished composition limits the yellowing of the coating. In addition to yellowing, a high content of these toxic polar aprotic solvents is needlessly expensive.

Consequently, the semi-finished composition according to the invention advantageously comprises a maximum of 2% toxic polar aprotic solvent by weight, and preferably a maximum of 0.3% by weight, with respect to the total weight of the semi-finished composition.

Advantageously, the polar aprotic solvent is non-toxic.

The one or more heterocyclic polymers can advantageously each have an acid value of between 1 and 200 mg of KOH/g.

Advantageously, these one or more heterocyclic polymers are selected from the group comprising polyimides (PI), polyamide-imides (PAI), polyetherimides (PEI), and polyamide-amic acids and their mixtures. These polymers offer a high level of heat resistance and good hardness that can be associated with the aromatic patterns of their structure.

For example, the semi-finished composition according to the invention can comprise a mixture of polyamide-imide and polyamide-amic acid.

Advantageously, the degree of polymerization of the one or more aforementioned heterocyclic polymers is greater than or equal to 5. For the purposes of this invention, the term "degree of polymerization of a polymer" refers to the number of repetitions of the one or more basic patterns in that polymer.

In one embodiment of this invention, the coating composition as described above may also comprise at least one aromatic polymer, the acid value of which is strictly less than 1 mg of KOH/g, and preferably equal to 0 mg of KOH/g, and which is in powder form with a $d_{90}$ of less than or equal to 20 μm, the relative heterocyclic polymer content by weight with respect to the aromatic polymer in the coating composition being greater than 50:50 and less than 100:0.

Advantageously, the combination of such an aromatic polymer with the heterocyclic polymer described above makes it possible to further limit the yellowing of the coatings obtained.

For the purposes of this invention, the term "aromatic polymer" refers to any polymer with at least one monomer pattern comprising at least one cyclic system that satisfies Hackers rule of aromaticity.

Advantageously, these one or more aromatic polymers are selected from the group comprising polyethersulfones (PES), polyether ether sulfones (PEES), polyphenylsulfones (PPSU), polyphenylene sulfides (PPS), polyether ether ketones (PEEK), polyether ketones (PEK), polyether ketone ketones (PEKK), polyether ether ketone ketones (PEEKK) and polyether ketone ether ketone ketones (PEKEKK), as well as derivatives and mixtures thereof.

Advantageously, the degree of polymerization of the aforementioned one or more aromatic polymers is greater than or equal to 5.

Another objective of this invention is an aqueous, amine-free, non-stick coating composition (or aqueous primary composition), which comprises:

An aqueous coating composition as previously defined; and

At least one fluorocarbon resin.

Preferably, the primary composition according to the invention comprises between 2 and 20%, and preferably between 8 and 15% solvent by weight, with respect to the total weight of said aqueous primary composition.

Advantageously, the solvent used in the aqueous primary composition is polar aprotic. The solvent may preferably comprise at least one of the following: N-formylmorpholine (NFM), dimethyl sulfoxide (DMSO), N-acetylmorpholine (NAM), N-ethylpyrrolidone (NEP) and N-methylpyrrolidone (NMP).

The primary composition according to the invention advantageously comprises a maximum of 1%, and preferably a maximum of 0.3%, toxic polar aprotic solvent by weight, with respect to the total weight of the aqueous primary composition.

Advantageously, the polar aprotic solvent is non-toxic. The polar aprotic solvent may preferably comprise at least one of the following: N-formylmorpholine (NFM) and dimethyl sulfoxide (DMSO). Adding a non-toxic polar aprotic solvent to the composition makes it possible to obtain a non-labeled (or in other words, non-toxic) primary composition.

Thus, the risks and dangers to the environment and people's health are limited. In addition, the use of non-toxic formulations is considerably easier, as these formulations can be used with only a minimum of precautions.

Advantageously, the one or more fluorocarbon resins are chosen from the group comprising the following: polytetrafluoroethylene (PTFE), copolymers of tetrafluoroethylene and perfluoropropyl vinyl ether (PFA), copolymers of tetrafluoroethylene and hexafluoropropene (FEP), polyvinylidene fluoride (PVDF), copolymers of tetrafluoroethylene and poly(methyl vinyl ether) (MVA), terpolymers of tetrafluoroethylene, poly(methyl vinyl ether) and fluoroalkyl vinyl ether (TFE/PMVE/FAVE), ethylene tetrafluoroethylene (ETFE) and their mixtures.

Advantageously, the fluorocarbon resin is polytetrafluoroethylene (PTFE) or a mixture of PTFE and PFA (PTFE/PFA), or a mixture of PTFE and FEP (PTFE/FEP).

Advantageously, the fluorocarbon resin accounts for 1 to 99%, and preferably 30 to 80% by weight, of the total dry weight of the primary composition.

If the primary composition does not comprise an aromatic polymer as stated above, the relative heterocyclic polymer content by weight with respect to the fluorocarbon resin is between 20:80 and 25:75.

If the primary composition comprises at least one aromatic polymer as stated above, the total relative content by weight of the heterocyclic polymer and the aromatic polymer, with respect to the fluorocarbon resin is between 20:80 and 25:75.

Advantageously, the primary composition according to the invention also comprises at least one filler.

Advantageously, the filler accounts for less than 40%, and preferably between 3 and 20% by weight, of the total dry weight of the primary composition.

Advantageously, the filler comprises silica nanoparticles and/or alumina nanoparticles and/or silicon carbide nanoparticles.

Another objective of this invention is a process for the preparation of an aqueous coating composition as defined above, comprising the following steps:

The provision of at least one heterocyclic polymer in powder form;

The preparation of a mixture comprising water and the powder from step (a); and

The grinding of the mixture resulting from step (b) to obtain a ground mixture comprising the heterocyclic polymer in powder form having a $d_{90}$ of less than or equal to 20 μm.

Advantageously, in this process of preparing a semi-finished composition according to the invention, solvent is added:
during the preparation of step (b); and/or
to the ground mixture resulting from step (c);
the total solvent content in the coating composition being a maximum of 15% by weight, with respect to the total weight of said coating composition.

In one embodiment of the process of preparing a semi-finished composition according to the invention, the process also comprises a step (a') of providing at least one aromatic polymer, the acid value of which is equal to 0 mg of KOH/g, and which is in powder form, and in which:

The mixture resulting from step (b) also comprises the powder from step (a'); and The grinding from step (c) makes it possible to obtain a ground mixture comprising the heterocyclic polymer and said aromatic polymer in powder form having a $d_{90}$ of less than or equal to 20 μm; and The relative heterocyclic polymer content by weight, with respect to the aromatic polymer in the ground mixture resulting from step (c) is greater than 50:50 and less than 100:0.

Advantageously, in the process of preparing a semi-finished composition according to this embodiment, solvent is added:
during the preparation of step (b); and/or
to the ground mixture resulting from step (c);
the total solvent content in the semi-finished composition being a maximum of 15% by weight, with respect to the total weight of said semi-finished composition.

In another embodiment of the process of preparing a semi-finished composition according to the invention, the process also comprises the following steps:

a') The provision of at least one aromatic polymer, the acid value of which is equal to 0 mg of KOH/g and which is in powder form;

b') The preparation of a mixture comprising water and the powder from step (a');

c') The grinding of the mixture resulting from step (b') to obtain a ground mixture comprising said aromatic polymer in powder form having a $d_{90}$ of less than or equal to 20 μm; and d) The mixing of the ground mixture resulting from step (c) and the ground mixture resulting from step (c');
the relative heterocyclic polymer content by weight, with respect to the aromatic polymer in the mixture resulting from step (d) being greater than 50:50 and less than 100:0.

Advantageously, in the process of preparing a semi-finished composition according to this other embodiment, solvent is added:
during the preparation of step (b); and/or
during the preparation of step (b'), as applicable; and/or
to the ground mixture resulting from step (c); and/or
to the ground mixture resulting from step (c') as applicable; and/or
to the mixture resulting from step (d), as applicable;
the total solvent content in the semi-finished composition being a maximum of 15% by weight, with respect to the total weight of said semi-finished composition.

Another objective of this invention is a process of preparing an aqueous coating composition comprising at least one aromatic polymer as defined above, comprising the following steps:

a) The provision of at least one heterocyclic polymer in powder form;

a') The provision of at least one aromatic polymer, the acid value of which is equal to 0 mg of KOH/g and which is in powder form;

b) The preparation of a mixture comprising water and the powder from step (a);

e) The grinding of the mixture resulting from step (b) to obtain a ground mixture comprising the heterocyclic polymer;

f) The preparation of a mixture comprising the ground mixture from step (e) and the powder from step (a'); and g) The grinding of the mixture resulting from step (f) to obtain a ground mixture comprising the heterocyclic polymer and said aromatic polymer in powder form having a $d_{90}$ of less than or equal to 20 μm;
the relative heterocyclic polymer content by weight, with respect to the aromatic polymer in the mixture resulting from step (g) being greater than 50:50 and less than 100:0.

Advantageously, in this process of preparing a semi-finished composition comprising at least one aromatic polymer, solvent is added:
during the preparation of step (b); and/or
to the ground mixture resulting from step (e); and/or
during the preparation of step (f); and/or
to the ground mixture resulting from step (g), as applicable;
the total solvent content in the semi-finished composition being a maximum of 15% by weight with respect to the total weight of said semi-finished composition.

Another objective of this invention is another process of preparing an aqueous coating composition comprising at least one aromatic polymer as defined above, comprising the following steps:

a) The provision of at least one heterocyclic polymer in powder form;

a') The provision of at least one aromatic polymer, the acid value of which is equal to 0 mg of KOH/g and which is in powder form;

b') The preparation of a mixture comprising water and the powder from step (a');

e') The grinding of the mixture resulting from step (b') to obtain a ground mixture comprising the aromatic polymer;

f') The preparation of a mixture comprising the ground mixture resulting from step (e') and the powder from step (a); and g') The grinding of the mixture resulting from step (f) to obtain a ground mixture comprising the heterocyclic polymer and the aromatic polymer in powder form having a $d_{90}$ of less than or equal to 20 µm;

the relative heterocyclic polymer content by weight, with respect to the aromatic polymer in the mixture resulting from step (g') being greater than 50:50 and less than 100:0.

Advantageously, in this process of preparing a semi-finished composition comprising at least one aromatic polymer, solvent is added:

during the preparation of step (b'); and/or to the ground mixture resulting from step (e'); and/or during the preparation of step (f'); and/or to the ground mixture resulting from step (g'), as applicable;

the total solvent content in the semi-finished composition being a maximum of 15% by weight, with respect to the total weight of said semi-finished composition.

Advantageously, the grinding in any of the processes of preparing a semi-finished composition according to the invention is a mechanical grinding at room temperature or an ultrasonic grinding.

Another objective of this invention is a process of preparing an aqueous non-stick coating composition as defined above, comprising the mixture of the aqueous coating composition as defined above, or as prepared according to any of the processes of preparing a coating composition as defined above, with at least one fluorocarbon resin.

The one or more fluorocarbon resins may be in the form of a powder or an aqueous dispersion.

Another objective of this invention is a process of producing an item comprising the following steps:

The provision of a metal substrate with two opposite surfaces;

The application, to one of the surfaces of said substrate, of at least one layer of aqueous semi-finished composition as defined above, or as prepared according to any of the processes of preparing a coating composition as defined above, or of at least one aqueous primary composition layer as defined above, or as prepared according to the process of preparing a non-stick coating composition as defined above; and then, The baking of the entire set at a temperature of between 300° C. and 430° C.

Advantageously, the process of producing an item according to the invention may also comprise, between the application step (ii) and the baking step (iii), the application, to said layer of semi-finished composition or primary composition, of at least one layer of finishing composition comprising at least one fluorocarbon resin.

Another objective of this invention is an item that can be obtained according to the process of producing an item as described above.

The item according to the invention can be a cooking tool, one of the surfaces of which is a concave, interior surface designed to be in contact with food placed inside said tool, and the other surface is a convex, exterior surface designed to be in contact with a heat source.

The invention is illustrated in greater detail in the following examples.

DETAILED DESCRIPTION OF THE INVENTION

Examples

Products
Media
Simply degreased, smooth aluminum media
Aqueous Semi-Finished Compositions
Triethylamine
Heterocyclic polymer resins:
Polyamide-amic acid in moist aqueous powder form with 35.5% dry matter (DM), containing less than 5% N-methylpyrrolidone (NMP) by weight, being of food grade and having a degree of polymerization on the order of 8
Polyamide-amic acid in moist aqueous powder form with 90% dry matter (DM), containing less than 5% N-methylpyrrolidone (NMP) by weight, being of food grade and having a degree of polymerization on the order of 10 to 20
Polyamide-imide (PAI) resin with 29% dry matter in N-ethylpyrrolidone (NEP), having a degree of polymerization on the order of 10 to 15
Other polymer resins:
Polyethersulfone (PES) resin, micronized grade, having a degree of polymerization of greater than 50
Non-labeled (or in other words, non-toxic, as the term is defined in this invention) polar aprotic solvents:
N-formylmorpholine (NFM)
Labeled (or in other words, toxic, as the term is defined in this invention) polar aprotic solvents:
N-ethylpyrrolidone (NEP)
Aqueous Primary Compositions
Non-labeled (or in other words, non-toxic, as the term is defined in this invention) polar aprotic solvents:
N-formylmorpholine (NFM)
Dimethyl sulfoxide (DMSO)
Labeled (or in other words, toxic, as the term is defined in this invention) polar aprotic solvents:
N-ethylpyrrolidone (NEP)
Filler: Colloidal silica without surface modification, which has a specific surface of approximately 220 $m^2/g$ and which is in the form of an aqueous dispersion of nanoparticles with 30% dry matter
Carbon black dispersion at 25% dry matter
PTFE dispersion at 60% dry matter
Alkylphenol ethoxylate-based non-ionic surfactant system at 13% dry matter
Ammonia hydroxide $NH_4OH$ (d=0.9)
Tests
Determining the Dry Matter of an Aqueous Primary or Semi-Finished Composition
Principle
The dry matter of a product is the residual solid portion remaining after evaporation of the volatile materials it contains. The temperature and duration of drying play a major role, as solvents with a high boiling point, monomer fractions, reactive thinners and reaction byproducts (depending on their degree of retention) are very slow to leave the film being formed. It is therefore very important to define, in a very conventional manner, standardized drying conditions that are as close as possible to actual conditions in practice.

Procedure

The procedure to measure this dry matter is as follows:
An aluminum dish is weighed: $m_0$=mass of the dish;
0.5 g to 3 g of the test product is placed in that dish;
The filled dish is weighed: $m_1$=mass of the filled dish;
The dish is placed in an oven at 210° C. for two hours;
After baking and cooling, the dish is weighed: $m_2$=mass of the filled dish after baking and cooling;
The dry matter is determined by the formula below:

Dry matter=$100*[m_2-m_0)/(m_1-m_0)]$

Measurement of the Size and Size Distribution of the Particles by Light Diffraction for Powders in Sizes of Between Approximately 100 nm and Approximately 5 mm After grinding the products in this invention, the ground powder is collected and its particle size is characterized using a laser diffraction particle size analyzer sold under the commercial name Mastersizer by the company Malvern.

Evaluation of the Adhesion of a Semi-Finished or Primary Layer on a Smooth Aluminum Substrate A cross-cut test is performed in accordance with ISO standard 2409, followed by an immersion of the coated item for 18 hours (consisting of an alternation of three 3-hour cycles in boiling water and three 3-hour cycles in oil at 200° C.). Then, the non-stick coating is observed for signs of detachment.

The rating is as follows:
No square must be detached to obtain a rating of 100 (excellent adhesion);
In case of detachment, the rating value is equal to the rating of 100 minus the number of detached squares.

Yellowing Evaluation

After baking, the coated plates are evaluated visually for yellowing by comparison between the plates.

Operating Principle of the Jar Mill (Mechanical Grinding)

Principle

Bead grinding consisting of loading a jar with the sample to be ground and "grinding" beads, and rotating the jar around its axis at a certain speed. The jar is generally rotated by means of a roller machine. The sample can be ground in dry form or dispersed in an appropriate solvent (e.g. in water, alcohol or a solvent). The dispersion may also contain certain adjuvants (like a dispersing agent or an anti-foaming agent).

Definition of the Main Grinding Parameters

Selection of Grinding Beads (Volume and Diameter(s))

The average diameter of the grinding beads must be appropriate for the size of the particles being ground. The finer the particles, the smaller the diameter of the beads that must be used. The total volume of beads, including the spaces between the beads, will account for approximately 50-60% of the interior volume of the jar. The beads of different sizes are advantageously distributed according to the following proportion by weight, with respect to the total weight of the beads: 25% small beads, 50% medium beads and 25% large beads. The size of the smallest beads is between 2 and 10 mm. Alumina and stabilized zirconia are commonly used as material for the beads.

Volume of Material in the Mill

To limit wear and tear on the grinding beads, the load being ground must cover the load of beads entirely. In general, it will be a volume corresponding to approximately 25% of the volume of the jar.

If the load being ground is a dry powder, the volume of beads will be adjusted after a few minutes of grinding. Because grinding reduces the size of the particles as well as the volume of the spaces between particles, it is necessary to periodically check whether the volume of load being ground is sufficient to cover all of the beads. If this is no longer the case, it is necessary to remove the excess beads in order to limit contamination of the powder as much as possible.

The duration of the grinding depends on the nature of the polymer resin being ground and on the desired final particle size.

Operating Principle of the Discontimill® Grinding Mill

This grinding is a mechanical grinding that consists of reducing the size of the particles and grains of the different types of materials, during which the suspension of the particles and grains is maintained under refrigeration.

The grinding operations are performed with a planetary mill, which consists of a disc, attached to which are two grinding jars, each having a volume of 45 mL and being able to hold up to 7 grinding beads that are 15 mm in diameter. The jars and the grinding beads are made of zirconium oxide, a material that is known for its very high resistance to impact and wear, enabling grinding for extended durations.

The grinding system operates by rotating the disc holding the jars around their own axes. The rotation speed is the same for the tray and the jars, varying from 100 rev/min to 800 rev/min. However, the directions of rotation are opposite, so as to generate opposing centrifugal forces.

Example 1: Aqueous Semi-Finished Composition According to the Invention (SF1)

Preparation of an Aqueous Polymer-Based, Amine-Free, Semi-Finished Composition (SF1)

An aqueous semi-finished composition (SF1) is produced with the following components, the respective quantities of which are listed below:

| Polyamide-amic acid (35.5% DM) | 616.0 g |
|---|---|
| Demineralized water | 726.3 g |
| TOTAL | 1342.3 g |

To make the aqueous semi-finished composition (SF1), a 3-liter jar mill system is used to obtain a paste consisting of a stable suspension of polyamide-amic acid particles in water, the final particle size of which is significant for spray coating and obtaining adhesion properties in the resulting coating.

The process is as follows:
The polyamide-amic acid powder, the initial particle size of which varies from a few hundred microns to mm, is placed into the jar; then,
Demineralized water is added;
The jar is kept at room temperature with the mixture thus obtained and the beads on rollers for the duration necessary and sufficient to reduce the size of the polyamide-amic acid particles.

The proportion of toxic polar aprotic solvent in the composition (SF1), which is NMP, is less than 2.3% by weight, with respect to the total weight of the composition.

The properties of the aqueous composition (SF1) thus obtained are as follows:
Theoretical dry matter: 16.3%
Dry matter measured in the composition: 16.2%
This is a suspension that is creamy white in color.
The pH of this composition is between 3 and 4.

Viscosity (in a 2.5-mm flow cup according to standard DIN EN ISO 2433): 45 sec; the composition (SF1) is still stable after 60 days of storage, and the change in viscosity over time is less than 20%.

A light diffraction particle sizing measurement using the Mastersizer laser particle size analyzer shows that a main peak is reached at $d_{50}$, centered on an average diameter of between 5 and 6 μm and a $d_{90}$ of 19 μm, which confirms that all of the powder has been placed in suspension.

Example 2: Aqueous Semi-Finished Composition According to the Invention (SF2)

Preparation of an Aqueous, Heterocyclic Polymer-Based, Amine-Free, Semi-Finished Composition (SF2) with Non-Labeled Polar Aprotic Solvent.

An aqueous semi-finished composition (SF2) is produced with the following components, the respective quantities of which are listed below:

| | |
|---|---|
| Polyamide-amic acid (35.5% DM) | 616.0 g |
| N-formylmorpholine | 130.0 g |
| Demineralized water | 596.3 g |
| TOTAL | 1342.3 g |

The procedure to produce the aqueous semi-finished composition (SF2), is the same as in Example 1.

The proportion of toxic polar aprotic solvent in the composition (SF2), which is NMP, is less than 2.3% by weight, with respect to the total weight of the composition.

The properties of the aqueous composition (SF2) thus obtained are as follows:

Theoretical dry matter: 16.3%

Dry matter measured in the composition: 16.2%

This is a suspension that is creamy white in color.

The pH of this composition is between 3 and 4.

Viscosity (in a 2.5-mm flow cup according to standard DIN EN ISO 2433): 50 sec; the composition (SF2) is still stable after 60 days of storage, and the change in viscosity over time is less than 20%.

A light diffraction particle sizing measurement using the Mastersizer laser particle size analyzer shows that a main peak is reached at $d_{50}$, centered on an average diameter of between 5 and 6 μm and a $d_{90}$ of 19 μm, which confirms that all of the powder has been placed in suspension.

Example 3: Aqueous Semi-Finished Composition According to the Invention (SF3)

Preparation of an Aqueous, Heterocyclic Polymer-Based, Amine-Free, Semi-Finished Composition According to the Invention (SF3) with Labeled Polar Aprotic Solvent.

An aqueous semi-finished composition (SF3) is produced with the following components, the respective quantities of which are listed below:

| | |
|---|---|
| Polyamide-amic acid (35.5% DM) | 616.0 g |
| N-ethylpyrrolidone | 142.0 g |
| Demineralized water | 584.0 g |
| TOTAL | 1342.0 g |

The procedure to produce the aqueous, semi-finished composition (SF3), is the same as in Example 1.

The properties of the aqueous composition (SF3) thus obtained are as follows:

Theoretical dry matter: 16.3%

Dry matter measured in the composition: 16.2%

This is a suspension that is creamy white in color.

The pH of this composition is between 3 and 4.

Viscosity (in a 2.5-mm flow cup according to standard DIN EN ISO 2433): 50 sec; the composition (SF3) is still stable after 60 days of storage, and the change in viscosity over time is less than 20%.

A light diffraction particle sizing measurement using the Mastersizer laser particle size analyzer shows that a main peak is reached at $d_{50}$, centered on an average diameter of between 5 and 6 μm and a $d_{90}$ of 19 μm, which confirms that all of the powder has been placed in suspension.

Example 4: Aqueous Semi-Finished Composition According to the Invention (SF4)

Preparation of an Aqueous, Heterocyclic Polymer-Based, Amine-Free, Semi-Finished Composition (SF4) with Non-Labeled Polar Aprotic Solvent.

An aqueous semi-finished composition (SF4) is produced with the following components, the respective quantities of which are listed below:

| | |
|---|---|
| Polyamide-amic acid (90% DM) | 131.3 g |
| N-formylmorpholine | 68.0 g |
| Demineralized water | 485.0 g |
| TOTAL | 684.3 g |

The procedure to produce the aqueous semi-finished composition (SF4) is the same as in Example 1.

The proportion of toxic polar aprotic solvent in the composition (SF4), which is NMP, is less than 1% by weight, with respect to the total weight of the composition.

The properties of the aqueous composition (SF4) thus obtained are as follows:

Theoretical dry matter: 17.3%

Dry matter measured in the composition: 18.0%

This is a suspension that is creamy white in color.

The pH of this composition is between 3 and 4.

Viscosity (in a 2.5-mm flow cup according to standard DIN EN ISO 2433): 59 sec; the composition (SF4) is still stable after 60 days of storage, and the change in viscosity over time is less than 20%.

A light diffraction particle sizing measurement using the Mastersizer laser particle size analyzer shows that a main peak is reached at $d_{50}$, centered on an average diameter of between 5 and 6 μm and a $d_{90}$ of 19 μm, which confirms that all of the powder has been placed in suspension.

Comparative Example 1: Aqueous Semi-Finished Composition (SFC1)

Preparation of an Aqueous, Heterocyclic Polymer-Based, Semi-Finished Composition (SFC1) with One Amine and Labeled Polar Aprotic Solvent.

An aqueous semi-finished composition (SFC1) is produced with the following components, the respective quantities of which are listed below:

| | |
|---|---|
| PAI resin at 29% dry matter in NEP | 327.9 g |
| N-ethylpyrrolidone | 117.7 g |
| Triethylamine | 32.8 g |
| Demineralized water | 521.6 g |
| TOTAL | 1000.0 g |

Putting the PAI in solution comprises a step for transitioning to the aqueous phase by obtaining a polyamide-amic acid salt. This step is performed in a Discontimill® brand bead mill, at room temperature in the presence of amine.

In the composition (SFC1), the weight ratio of water to amine is approximately 94/6. The percentage by weight of amine in the composition (SFC1) is 3.3%.

The weight ratio of polyamide-imide to amine is approximately 74/26. The proportion of polar aprotic solvent in the composition (SFC1) is 35.0% by weight, with respect to the total weight of the composition (SFC1).

The properties of the aqueous composition (SFC1) thus obtained are as follows:

Theoretical dry matter: 9.5%

Dry matter measured in the composition: 9.3%

This is a solution that is translucent yellow in color and very viscous.

Viscosity (in a 4-mm flow cup according to standard DIN EN ISO 2433/ASTM D5125): 130 sec;

A light diffraction particle sizing measurement using the Mastersizer laser particle size analyzer shows that the particle size is much below 1 μm, which confirms that all of the polyamide-imide resin has been placed in emulsion.

Comparative Example 2: Aqueous Semi-Finished Composition (SFC2)

Preparation of an Aqueous, Heterocyclic Polymer-Based, Semi-Finished Composition (SFC2) with a $d_{90}$ of Greater than 40 μm, without Polar Aprotic Solvent or Amine.

An aqueous semi-finished composition (SFC2) is produced with the following components, the respective quantities of which are listed below:

| | |
|---|---|
| Polyamide-amic acid (35.5% DM) | 458.9 g |
| Demineralized water | 541.1 g |
| TOTAL | 1000.0 g |

To produce the aqueous semi-finished composition (SFC2), the same procedure is followed as in Example 1 according to the invention.

The properties of the aqueous composition (SFC2) thus obtained are as follows:

Theoretical dry matter: 16.3%

Dry matter measured in the composition: 16.2%

This is a solution that is creamy white in color.

The pH of this composition is between 3 and 4.

The composition (SFC2) settles in one day.

A light diffraction particle sizing measurement using the Mastersizer laser particle size analyzer shows that a main peak is reached at $d_{50}$, centered on an average diameter of approximately 20 μm and a $d_{90}$ of approximately 48 μm.

Comparative Example 3: Aqueous Semi-Finished Composition (SFC3)

Preparation of an Aqueous, Heterocyclic Polymer-Based, Semi-Finished Composition (SFC3), without Polar Aprotic Solvent and with One Amine.

An aqueous semi-finished composition (SFC3) is produced with the following components, the respective quantities of which are listed below:

| | |
|---|---|
| Polyamide-amic acid (35.5% DM) | 149.0 g |
| Triethylamine | 26.0 g |
| Demineralized water | 710.0 g |
| TOTAL | 885.0 g |

The procedure to produce the aqueous semi-finished composition (SFC3), is as follows:

The water, polyamide-amic acid powder and amine are placed into a reactor;

The resulting mixture is agitated, then heated at a temperature of between 50 and 85° C.;

The weight ratio of water to amine is approximately 97/3. The percentage by weight of amine in the composition (SFC3) is 2.9%. The proportion of polar aprotic solvent in the composition (SFC3) is less than 1% by weight, with respect to the total weight of the composition.

The properties of the aqueous composition (SFC3) thus obtained are as follows:

Theoretical dry matter: 6.0%

Dry matter measured in the composition: 6.1%

This is a very fluid emulsion that is opalescent white in color.

The pH of this composition is between 10 and 11.

Viscosity (in a 2.5-mm flow cup according to standard DIN EN ISO 2433/ASTM D5125): 50 sec; after aging at 40° C., the semi-finished composition (SFC3) is still stable after 60 days of storage, and the change in viscosity over time is less than 20%.

A light diffraction particle sizing measurement using the Mastersizer laser particle size analyzer shows that the particle size is well below 1 μm, which confirms that all of the polyamide-amic acid resin has been placed in emulsion.

Example 5: Aqueous Primary Composition According to the Invention (P1)

Preparation of an Aqueous Primary Composition According to the Invention (P1) Based on the Semi-Finished Composition (SF1) in Example 1.

An aqueous primary composition (P1) for adhesion is produced with the following components, the respective quantities of which are listed below:

| | |
|---|---|
| PTFE dispersion | 33.3 g |
| Carbon black dispersion | 3.8 g |
| Semi-finished composition SF1 (16.3% dry matter) | 30.0 g |
| N-formylmorpholine | 9.9 g |
| Non-ionic surfactant system | 5.6 g |
| Colloidal silica | 12.0 g |
| NH$_4$OH | 0.8 g |
| Demineralized water | 4.6 g |
| TOTAL | 100.0 g |

Regarding the non-toxic polar aprotic solvent in the composition (P1), the NFM content is 9.9% by weight, with respect to the total weight of the composition (P1).

Regarding the toxic polar aprotic solvent in the composition (P1), the NMP content is less than 0.7% by weight, with respect to the total weight of the composition (P1); the NMP comes from the semi-finished composition (SF1).

The proportion of fluorinated resin in the dry primary composition (P1) is on the order of 66.3% by weight, with respect to the total dry weight of the composition (P1). The relative content by weight of polyamide-amic acid/PTFE is approximately 20:80.

The properties of the primary composition (P1) thus obtained are:
Theoretical dry matter in the composition: 30.1%
Viscosity (in a 2.5-mm flow cup according to standard DIN EN ISO 2433/ASTM D5125): 48 sec.

Example 6: Aqueous Primary Composition According to the Invention (P2)

Preparation of an Aqueous Primary Composition According to the Invention (P2) Based on the Aqueous Semi-Finished Composition (SF2) in Example 2.

An aqueous primary composition (P2) for adhesion is produced with the following components, the respective quantities of which are listed below:

| | |
|---|---|
| PTFE dispersion | 36.1 g |
| Carbon black dispersion | 4.1 g |
| Semi-finished composition SF2 (16.3% dry matter) | 34.1 g |
| Non-ionic surfactant system | 6.0 g |
| Colloidal silica | 13.0 g |
| NH$_4$OH | 0.8 g |
| Demineralized water | 5.9 g |
| TOTAL | 100.0 g |

Regarding the non-labeled polar aprotic solvent in the composition (P2), the NFM content is 3.3% by weight, with respect to the total weight of the composition (P2); the NFM comes from the semi-finished composition (SF2).

Regarding the labeled polar aprotic solvent in the composition (P2), the NMP content is less than 0.8% by weight, with respect to the total weight of the composition (P2); the NMP comes from the semi-finished composition (SF2).

The proportion of fluorinated resin in the dry primary composition (P2) is on the order of 66.6% by weight, with respect to the total dry weight of the composition (P2). The relative content by weight of polyamide-amic acid/PTFE is approximately 20:80.

The properties of the primary composition (P2) thus obtained are as follows:
Theoretical dry matter in the composition: 32.9%
Viscosity (in a 2.5-mm flow cup according to standard DIN EN ISO 2433/ASTM D5125): 51 sec.

Example 7: Aqueous Primary Composition According to the Invention (P3)

Preparation of an Aqueous Primary Composition According to the Invention (P3) Based on the Semi-Finished Composition (SF3) in Example 3.

An aqueous primary composition (P3) for adhesion is produced with the following components, the respective quantities of which are listed below:

| | |
|---|---|
| PTFE dispersion | 33.2 g |
| Carbon black dispersion | 3.8 g |
| Semi-finished composition SF3 (16.3% dry matter) | 29.1 g |
| Dimethyl sulfoxide | 10.1 g |
| Non-ionic surfactant system | 5.6 g |
| Colloidal silica | 11.9 g |
| NH$_4$OH | 0.8 g |
| Demineralized water | 5.5 g |
| TOTAL | 100.0 g |

Regarding the non-labeled polar aprotic solvent in the composition (P3), the DMSO content is 10.1% by weight, with respect to the total weight of the composition (P3).

Regarding the labeled polar aprotic solvents in the composition (P3), the NMP content is less than 0.7% by weight, and the NEP content is 3.1% by weight with respect to the total weight of the composition (P3); the NMP and the NEP come from the semi-finished composition (SF3).

The proportion of fluorinated resin in the dry primary composition (P3) is on the order of 66.6% by weight, with respect to the total dry weight of the composition (P3). The relative content by weight of polyamide-amic acid/PTFE is approximately 20:80.

The properties of the primary composition (P3) thus obtained are as follows:
Theoretical dry matter in the composition: 30.0%
Viscosity (in a 2.5-mm flow cup according to standard DIN EN ISO 2433/ASTM D5125): 49 sec.

Example 8: Aqueous Primary Composition According to the Invention (P4)

Preparation of an Aqueous Primary Composition According to the Invention (P4) Based on the Semi-Finished Composition (SF2) in Example 2 and a Semi-Finished Composition Comprising PES.

First, an aqueous, PES-based, semi-finished composition is produced with the following components, the respective quantities of which are listed below:

| | |
|---|---|
| Polyethersulfone (100% dry matter) | 119.1 g |
| Demineralized water | 625.0 g |
| TOTAL | 744.1 g |

The aqueous, PES-based, semi-finished composition is produced using an initial polyethersulfone powder, which has a particle size ranging from 20 μm to 10 mm, and more specifically, a d$_{90}$ of between 40 and 60 μm and a d$_{50}$ of between 20 and 40 μm.

Placing the PES in suspension comprises a grinding step, the grinding being done in a Discontimill® brand bead mill at room temperature to reduce the size of the PES particles.

The process is as follows:
The polyethersulfone powder is placed into the mill; then,
The demineralized water is added to the mill; and finally,
The grinding step is performed.

The properties of the aqueous, PES-based composition thus obtained are as follows:
Theoretical dry matter in the composition: 16.0%
Dry matter measured in the composition: 16.2%
This is a suspension that is opaque white in color.
The pH of this composition is between 6 and 7.
Viscosity (in a 4-mm flow cup according to standard DIN EN ISO 2433/ASTM D5125): >30 sec: after aging at 40° C., the PES-based composition is still stable after 60 days of storage, and the change in viscosity over time is less than 20%.

A light diffraction particle sizing measurement using the Mastersizer laser particle size analyzer shows that a main peak is reached at $d_{50}$, centered on an average diameter of 5 to 6 μm and a $d_{90}$ of 19 μm, which confirms that all of the powder has been placed in suspension.

An aqueous primary composition (P4) for adhesion is produced with the following components, the respective quantities of which are listed below:

| | |
|---|---|
| PTFE dispersion | 37.6 g |
| Carbon black dispersion | 2.8 g |
| Semi-finished composition SF2 (16.3% dry matter) | 21.9 g |
| PES-based semi-finished composition (16.0% dry matter) | 12.5 g |
| N-formylmorpholine | 7.2 g |
| Non-ionic surfactant system | 4.2 g |
| Colloidal silica | 9.0 g |
| NH$_4$OH | 0.5 g |
| Demineralized water | 4.3 g |
| TOTAL | 100.0 g |

The weight ratio of polyamide-amic acid to polyethersulfone is approximately 64/36.

Regarding the non-labeled polar aprotic solvent in the composition (P4), the NFM content is 9.3% by weight, with respect to the total weight of the composition (P4).

Regarding the labeled polar aprotic solvents in the composition (P4), the NMP content is less than 0.5% by weight, with respect to the total weight of the composition (P4); the NMP comes from the semi-finished composition (SF2).

The proportion of fluorinated resin in the dry primary composition (P4) is on the order of 70% by weight, with respect to the total dry weight of the composition (P4). The relative content by weight of polyamide-amic acid and polyethersulfone/PTFE is approximately 20:80.

The properties of the primary composition (P4) thus obtained are as follows:
Theoretical dry matter in the composition: 32.1%
Viscosity (in a 2.5-mm flow cup according to standard DIN EN ISO 2433/ASTM D5125): 49 sec Example 9: Aqueous Primary Composition According to the Invention (P5)

Preparation of an Aqueous Primary Composition According to the Invention (P5) Based on the Semi-Finished Composition (SF4) in Example 4.

An aqueous primary composition (P5) for adhesion is produced with the following components, the respective quantities of which are listed below:

| | |
|---|---|
| PTFE dispersion | 33.3 g |
| Carbon black dispersion | 3.8 g |
| Semi-finished composition SF4 (17.3% dry matter) | 28.5 g |
| N-formylmorpholine | 9.9 g |
| Non-ionic surfactant system | 5.6 g |
| Colloidal silica | 12.0 g |
| NH$_4$OH | 1.6 g |
| Demineralized water | 5.3 g |
| TOTAL | 100.0 g |

Regarding the non-toxic polar aprotic solvent in the composition (P5), the NFM content is 12.7% by weight, with respect to the total weight of the composition (P5).

Regarding the toxic polar aprotic solvent in the composition (P5), the NMP content is less than 0.3% by weight, with respect to the total weight of the composition (P5); the NMP comes from the semi-finished composition (SF4).

The proportion of fluorinated resin in the dry primary composition (P5) is on the order of 66.2% by weight with respect to the total dry weight of the composition (P5). The relative content by weight of polyamide-amic acid/PTFE is approximately 20:80.

The properties of the primary composition (P5) thus obtained are as follows:
Theoretical dry matter in the composition: 30.2%
Viscosity (in a 2.5-mm flow cup according to standard DIN EN ISO 2433/ASTM D5125): 58 sec Comparative Example 4: Aqueous Primary Composition (PC1)

Preparation of an Aqueous Primary Composition (PC1) Based on the Semi-Finished Composition (SF1) in Comparative Example 1.

An aqueous primary composition (PC1) for adhesion is produced with the following components, the respective quantities of which are listed below:

| | |
|---|---|
| PTFE dispersion | 30.5 g |
| Carbon black dispersion | 3.5 g |
| Semi-finished composition SFC1 (9.5% dry matter) | 47.2 g |
| Non-ionic surfactant system | 5.1 g |
| Colloidal silica | 11.0 g |
| NH$_4$OH | 1.4 g |
| Demineralized water | 1.3 g |
| TOTAL | 100.0 g |

The proportion of amine in the primary composition (PC1) is 1.5% by weight with respect to the total weight of the composition (PC1); the amine comes from the semi-finished composition (SFC1).

Regarding the labeled polar aprotic solvent in the composition (PC1), the NEP content is 16.5% by weight, with respect to the total weight of the composition (PC1); the NEP comes from the semi-finished composition (SFC1).

The proportion of fluorinated resin in the dry primary composition (PC1) is on the order of 66.6% by weight, with respect to the total dry weight of the composition (PC1). The relative content by weight of polyamide-amic acid/PTFE is approximately 20:80.

The properties of the primary composition (PC1) thus obtained are as follows:
Theoretical dry matter in the composition: 27.6%
Viscosity (in a 2.5-mm flow cup according to standard DIN EN ISO 2433/ASTM D5125): 55 sec.

Comparative Example 5: Aqueous Primary Composition (PC2)

Preparation of an Aqueous Primary Composition (PC2) Based on the Semi-Finished Composition (SFC2) in Comparative Example 2.

An aqueous primary composition (PC2) for adhesion is produced with the following components, the respective quantities of which are listed below:

| | |
|---|---|
| PTFE dispersion | 36.9 g |
| Carbon black dispersion | 4.2 g |
| Semi-finished composition SFC2 (16.3% dry matter) | 33.6 g |
| N-ethylpyrrolidone | 2.6 g |
| Non-ionic surfactant system | 6.2 g |
| Colloidal silica | 13.3 g |
| $NH_4OH$ | 1.7 g |
| Demineralized water | 1.5 g |
| TOTAL | 100.0 g |

Regarding the labeled polar aprotic solvents in the composition (PC2), the NMP content is less than 0.8% by weight, and the NEP content is 2.6% by weight, with respect to the total weight of the composition (PC2); the NMP comes from the semi-finished composition (SFC2).

The proportion of fluorinated resin in the dry primary composition (PC2) is on the order of 66.6% by weight with respect to the total dry weight of the composition (PC2). The relative content by weight of polyamide-amic acid/PTFE is approximately 20:80.

The properties of the primary composition (PC2) thus obtained are as follows:
Theoretical dry matter in the composition: 33.5%
Viscosity (in a 2.5-mm flow cup according to standard DIN EN ISO 2433/ASTM D5125): 55 sec.

Comparative Example 6: Aqueous Primary Composition (PC3)

Preparation of an Aqueous Primary Composition (PC3) Based on the Semi-Finished Composition (SF1) in Example 1.

An aqueous primary composition (PC3) for adhesion is produced with the following components, the respective quantities of which are listed below:

| | |
|---|---|
| PTFE dispersion | 37.5 g |
| Carbon black dispersion | 4.3 g |
| Semi-finished composition SF1 (16.3% dry matter) | 34.1 g |
| Non-ionic surfactant system | 6.3 g |
| Colloidal silica | 13.5 g |
| $NH_4OH$ | 1.8 g |
| Demineralized water | 2.5 g |
| TOTAL | 100.0 g |

Regarding the labeled polar aprotic solvent in the composition (PC3), the NMP content is less than 0.8% by weight with respect to the total weight of the composition (PC3); the NMP comes from the semi-finished composition (SF1).

The proportion of fluorinated resin in the dry primary composition (PC3) is on the order of 66.6% by weight, with respect to the total dry weight of the composition (PC3). The relative content by weight of polyamide-amic acid/PTFE is approximately 20:80.

The properties of the primary composition (PC3) thus obtained are as follows:
Theoretical dry matter in the composition: 34.0%
Viscosity (in a 2.5-mm flow cup according to standard DIN EN ISO 2433/ASTM D5125): 51 sec.

Comparative Example 7: Aqueous Primary Composition (PC4)

Preparation of an Aqueous Primary Composition (PC4) Based on the Semi-Finished Composition (SFC3) in Comparative Example 3.

An aqueous primary composition (PC4) for adhesion is produced with the following components, the respective quantities of which are listed below:

| | |
|---|---|
| PTFE dispersion | 23.6 g |
| Carbon black dispersion | 2.7 g |
| Semi-finished composition SFC3 (6% dry matter) | 59.2 g |
| Non-ionic surfactant system | 4.0 g |
| Colloidal silica | 8.5 g |
| $NH_4OH$ | 1.2 g |
| Demineralized water | 0.8 g |
| TOTAL | 100.0 g |

The proportion of amine in the primary composition (PC4) is 1.7% by weight, with respect to the total weight of the composition (PC4); the amine comes from the semi-finished composition (SFC3).

Regarding the labeled polar aprotic solvent in the composition (PC4), the NMP content is less than 0.5% by weight, with respect to the total weight of the composition (PC4); the NMP comes from the semi-finished composition (SFC3).

The proportion of fluorinated resin in the dry primary composition (PC4) is on the order of 66.6% by weight, with respect to the total dry weight of the composition (PC4). The relative content by weight of polyamide-amic acid/PTFE is approximately 20:80.

The properties of the primary composition (PC4) thus obtained are as follows:
Theoretical dry matter in the composition: 21.4%
Viscosity (in a 2.5-mm flow cup according to standard DIN EN ISO 2433/ASTM D5125): 41 sec.

Results of the Tests Performed

The aqueous semi-finished and primary compositions described above are listed in Table 1 below. The coatings obtained from these various compositions are subject to adhesion testing of the primary composition on the substrate and to coloration testing.

The coloration of the coating, evaluated visually, makes it possible to verify that the formulas produced according to the invention show acceptably little to no yellowing in comparison to the traditional formulations that include amines.

Coating adhesion is ensured when the size of the powder is compliant with the invention.

TABLE 1

| | | | | | SF2 + PES-based SF | | | | | |
|---|---|---|---|---|---|---|---|---|---|---|
| SEMI-FINISHED | Semi-finished composition | SF1 | SF2 | SF3 | | SF4 | SFC1 | SFC2 | SF1 | SFC3 |
| | Example | Ex. 1 | Ex. 2 | Ex. 3 | — | Ex. 4 | Comp. Ex. 1 | Comp. Ex. 2 | Ex. 1 | Comp. Ex. 3 |
| | Resin type | PAI powder | PAI powder | PAI powder | PAI powder + PES powder | PAI powder | PAI solvent | PAI powder | PAI powder | PAI powder |
| | Amine type | 0 | 0 | 0 | 0 | 0 | TEA = 3.3% | 0 | 0 | TEA = 2.9% |
| | Resin particle size | $d_{90}$ <20 µm $d_{50}$ <10 µm | $d_{90}$ <20 µm $d_{50}$ <10 µm | $d_{90}$ <20 µm $d_{50}$ <10 µm | $d_{90}$ <20 µm $d_{50}$ <10 µm | $d_{90}$ <20 µm $d_{50}$ <10 µm | Emulsion | $d_{90}$ <20 µm $d_{50}$ <10 µm | $d_{90}$ <20 µm $d_{50}$ <10 µm | emulsion |
| | Polar aprotic solvent | NMP <2.3% | NMP <2.3% NFM = 9.7% | NMP <2.3% NEP = 10.6% | In SF2 NMP <2.3% NFM = 9.7% | NMP <1% NFM = 9.9% | NEP = 35% | NMP <2.3% | NMP <2.3% | NMP <1% |
| PRIMARY | Primary composition | P1 | P2 | P3 | P4 | P5 | PC1 | PC2 | PC3 | PC4 |
| | Example | Ex. 5 | Ex. 6 | Ex. 7 | Ex. 8 | Ex. 9 | Comp. Ex. 4 | Comp. Ex. 5 | Comp. Ex. 6 | Comp. Ex.7 |
| | Non-labeled polar aprotic solvent | NFM = 9.9% | NFM = 3.3% | DMSO = 10.1% | NFM = 9.3% | NFM = 12.7% | 0 | 0 | 0 | 0 |
| | Labeled polar aprotic solvent | NMP <0.7% | NMP <0.8% | NMP <0.7% NEP = 3.1% | NMP <0.5% | NMP <0.3% | NEP = 16.5% | NMP <0.8% NEP = 2.6% | NMP <0.8% | NMP <0.5% |
| TESTS | Coating coloration | LOW | LOW | LOW | VERY LOW | LOW | Significant unacceptable yellowing | LOW | LOW | Significant unacceptable yellowing |
| | Adhesion test on smooth Al substrate | Excellent | Excellent | Good | Excellent | Excellent | Excellent | Poor | Poor | Excellent |

The invention claimed is:

1. Aqueous amine-free coating composition comprising at least one heterocyclic polymer, wherein the heterocyclic polymer is in powder form with a $d_{90}$ of less than or equal to 20 µm, and wherein the heterocyclic polymer is selected from the group consisting of polyether imides (PEI), polyamide-amic acids, and their mixtures.

2. The coating composition according to claim 1, comprising a maximum of 15% polar aprotic solvent by weight, with respect to the total weight of the coating composition.

3. The coating composition according to claim 1, also comprising at least one aromatic polymer, an acid value of which is equal to 0 mg of KOH/g, and which is in powder form with a $d_{90}$ of less than or equal to 20 µm, a relative content by weight of the heterocyclic polymer with respect to the aromatic polymer in the coating composition being greater than 50:50 and less than 100:0.

4. The coating composition according to claim 3, in which said aromatic polymer is selected from the group consisting of polyethersulfones (PES), polyether ether sulfones (PEES), polyphenylsulfones (PPSU), polyphenylene sulfides (PPS), polyether ether ketones (PEEK), polyether ketones (PEK), polyether ketone ketones (PEKK), polyether ether ketone ketones (PEEKK), polyether ketone ether ketone ketones (PEKEKK) and mixtures.

5. Aqueous, amine-free, non-stick coating composition, comprising an aqueous coating composition according to claim 1 and at least one fluorocarbon resin.

6. The non-stick coating composition according to claim 5, comprising between 2 and 20% polar aprotic solvent by weight, with respect to the total weight of the non-stick coating composition.

7. The non-stick coating composition according to claim 5, comprising a maximum of 1% toxic polar aprotic solvent by weight, with respect to the total weight of the non-stick coating composition.

8. Process of preparing an aqueous, amine-free coating composition according to claim 1, wherein the process comprises the following steps:
    a) providing at least one heterocyclic polymer in powder form, the heterocyclic polymer being selected from the group consisting of polyether imides (PEI), polyamide-amic acids, and their mixtures;
    b) preparing a mixture comprising water and the powder from step (a); and
    c) grinding of the mixture resulting from step (b) to obtain a ground mixture comprising the heterocyclic polymer in powder form with a $d_{90}$ of less than or equal to 20 µm.

9. Process of preparing an aqueous, amine-free, non-stick coating composition wherein the process comprises mixing of the aqueous coating composition according to claim 1, with a fluorocarbon resin.

* * * * *

UNITED STATES PATENT AND TRADEMARK OFFICE
CERTIFICATE OF CORRECTION

| | | |
|---|---|---|
| PATENT NO. | : 10,465,076 B2 | Page 1 of 1 |
| APPLICATION NO. | : 15/320523 | |
| DATED | : November 5, 2019 | |
| INVENTOR(S) | : Barbara Gantillon et al. | |

It is certified that error appears in the above-identified patent and that said Letters Patent is hereby corrected as shown below:

On the Title Page

Column 2, Item (45), Date of Patent, insert -- * Nov. 5, 2019 --

Signed and Sealed this
Eighteenth Day of February, 2020

Andrei Iancu
*Director of the United States Patent and Trademark Office*